(12) United States Patent
Pemberton

(10) Patent No.: US 10,132,448 B2
(45) Date of Patent: Nov. 20, 2018

(54) CYLINDER REGULATOR GUARD LIFTING ARRANGEMENT

(71) Applicant: Air Products and Chemicals, Inc., Allentown, PA (US)

(72) Inventor: Gareth Ross Pemberton, Worcester (GB)

(73) Assignee: Air Products and Chemicals, Inc., Allentown, PA (US)

( * ) Notice: Subject to any disclaimer, the term of this patent is extended or adjusted under 35 U.S.C. 154(b) by 0 days.

(21) Appl. No.: 14/909,891

(22) PCT Filed: Aug. 1, 2014

(86) PCT No.: PCT/EP2014/066657
§ 371 (c)(1),
(2) Date: Feb. 3, 2016

(87) PCT Pub. No.: WO2015/018769
PCT Pub. Date: Feb. 12, 2015

(65) Prior Publication Data
US 2016/0178130 A1  Jun. 23, 2016

(30) Foreign Application Priority Data
Aug. 6, 2013  (EP) .................................... 13179495

(51) Int. Cl.
*B65D 41/00* (2006.01)
*B65D 43/00* (2006.01)
(Continued)

(52) U.S. Cl.
CPC .............. *F17C 13/04* (2013.01); *F17C 13/06* (2013.01); *F17C 2201/0104* (2013.01);
(Continued)

(58) Field of Classification Search
CPC .............. F16K 35/10; F17C 2205/0308; F17C 2205/0302; B65D 59/06
See application file for complete search history.

(56) References Cited

U.S. PATENT DOCUMENTS

| 1,751,435 A | 3/1930 | Zenner |
| 4,880,134 A | 11/1989 | Wood, Jr. |

(Continued)

FOREIGN PATENT DOCUMENTS

| CN | 2122307 | 11/1992 |
| CN | 2157391 | 2/1994 |

(Continued)

OTHER PUBLICATIONS

European Patent Office, International Search Report of the International Searching Authority, dated Dec. 12, 2014, for PCT/EP2014/066657.

*Primary Examiner* — Andrew T Kirsch
(74) *Attorney, Agent, or Firm* — Larry S. Zelson

(57) ABSTRACT

There is provided a guard structure for a gas cylinder assembly, the gas cylinder assembly comprising a gas cylinder body and a valve, the gas cylinder body including a base and a neck to which a proximal end of the valve is connected in use, the guard structure being securable to the gas cylinder assembly and comprising a guard body arranged, in use, to surround the valve, wherein the guard body further comprises a dependent lip extending around substantially the entire perimeter of the guard body, the dependent lip being located and arranged to be graspable by at least one user to enable the gas cylinder assembly to be lifted and/or maneuvered.

14 Claims, 5 Drawing Sheets

(51) Int. Cl.
*F16K 35/10* (2006.01)
*F17C 13/04* (2006.01)
*F17C 13/06* (2006.01)

(52) U.S. Cl.
CPC .......... *F17C 2201/0109* (2013.01); *F17C 2201/0119* (2013.01); *F17C 2201/032* (2013.01); *F17C 2201/056* (2013.01); *F17C 2201/058* (2013.01); *F17C 2203/0617* (2013.01); *F17C 2203/0619* (2013.01); *F17C 2203/0639* (2013.01); *F17C 2203/0646* (2013.01); *F17C 2203/0663* (2013.01); *F17C 2205/0153* (2013.01); *F17C 2205/0165* (2013.01); *F17C 2205/0308* (2013.01); *F17C 2205/0323* (2013.01); *F17C 2205/0329* (2013.01); *F17C 2205/0338* (2013.01); *F17C 2205/0341* (2013.01); *F17C 2205/0385* (2013.01); *F17C 2205/0394* (2013.01); *F17C 2221/011* (2013.01); *F17C 2221/012* (2013.01); *F17C 2221/014* (2013.01); *F17C 2221/015* (2013.01); *F17C 2221/016* (2013.01); *F17C 2221/033* (2013.01); *F17C 2223/0123* (2013.01); *F17C 2223/036* (2013.01); *F17C 2270/0745* (2013.01); *Y02E 60/321* (2013.01)

(56) References Cited

U.S. PATENT DOCUMENTS

| | | |
|---|---|---|
| 5,088,685 A | 2/1992 | Salvucci, Sr. |
| 5,261,559 A | 11/1993 | Salvucci, Sr. |
| 5,505,226 A | 4/1996 | Breth |
| 5,845,809 A * | 12/1998 | Garrett ............... F16K 35/10 220/728 |
| 6,311,722 B1 | 11/2001 | Gounot et al. |
| 6,415,946 B2 | 7/2002 | Carlo et al. |
| 6,910,602 B2 | 6/2005 | Hasaka et al. |
| 8,534,312 B2 | 9/2013 | Burgess et al. |
| 2006/0065672 A1 | 3/2006 | Lecourt et al. |
| 2009/0014453 A1 | 1/2009 | Bleys et al. |
| 2009/0038691 A1 | 2/2009 | Birch et al. |
| 2009/0050218 A1 * | 2/2009 | Burgess ............... F17C 13/06 137/557 |
| 2010/0012663 A1 | 1/2010 | Andreani et al. |
| 2011/0278316 A1 | 11/2011 | Herzer et al. |
| 2015/0083237 A1 | 3/2015 | Ligonesche et al. |
| 2015/0167896 A1 | 6/2015 | Frenal |
| 2015/0335191 A1 * | 11/2015 | Backaert ............... A47J 36/027 206/459.1 |

FOREIGN PATENT DOCUMENTS

| | | |
|---|---|---|
| CN | 101438092 | 5/2009 |
| EP | 1013986 A1 | 6/2000 |
| FR | 2803366 | 7/2001 |
| JP | H05133500 | 5/1993 |
| JP | 0747796 | 10/2001 |
| JP | 2002122297 A | 4/2002 |
| JP | 2006214473 A | 8/2006 |
| JP | 4611485 | 1/2011 |
| KR | 19990024068 | 7/1999 |
| WO | 2012164182 | 12/2012 |

* cited by examiner

CYLINDER REGULATOR GUARD LIFTING ARRANGEMENT

The present invention relates a lifting arrangement for a gas cylinder and valve arrangement. More particularly, the present invention relates to a cylinder regulator guard incorporating a lifting arrangement to enable straightforward manipulation of a gas cylinder in use.

A compressed gas cylinder is a pressure vessel designed to contain gases at high pressures, i.e. at pressures significantly greater than atmospheric pressure. Compressed gas cylinders are used in a wide range of markets, from the low cost general industrial market, through the medical market, to higher cost applications, such as electronics manufacture utilising high purity corrosive, toxic or pyrophoric speciality gases. Many applications for which gas cylinders are used involve the provision of purified permanent gases. Non-exhaustive examples of such gases may be: Oxygen, Nitrogen, Argon, Helium, Hydrogen, Methane, Nitrogen Trifluoride, Carbon Monoxide, Krypton or Neon.

Commonly, pressurised gas containers comprise steel, aluminium or composites and are capable of storing compressed, liquefied or dissolved gases with a maximum filling pressure up to 450 bar g for most gases, and up to 900 bar g for gases such as hydrogen and helium. Such high storage pressures are potentially hazardous, and cylinders are required to meet stringent safety standards and, of course, require careful handling by the end user.

In order to dispense gases effectively and controllably from a gas cylinder or other pressure vessel, a regulator or valve assembly is required. A valve provides a mechanism by which the flow of gas can be controlled. A regulator is able to regulate the flow of the gas such that the gas is dispensed at a constant, or user variable, pressure.

FIG. 1 shows a schematic view of a gas cylinder assembly 10. The gas cylinder assembly 10 comprises a gas cylinder 12 having a gas cylinder body 14 and a valve 16. The gas cylinder body 14 comprises a generally cylindrical container having a flat base 18 arranged to enable the gas cylinder 12 to stand unsupported on a flat surface.

The gas cylinder body 14 is formed from steel, aluminium and/or composite materials and is adapted and arranged to withstand internal pressures up to approximately 900 bar g. A neck 20 which defines an aperture 20a is located opposite to the base 18 and comprises a screw thread (not shown) adapted to receive the valve 16.

The gas cylinder body 14 and valve 16 define a pressure vessel (in this embodiment, in the form of the gas cylinder 12) having an internal volume. The valve 16 comprises a housing 22, an outlet 24, a valve body 26 and a valve seat 28. The housing 22 comprises a complementary screw thread for engagement with the aperture 20 of the gas cylinder body 14. The outlet 24 is adapted and arranged to enable the gas cylinder 12 to be connected to other components in a gas assembly; for example, hoses, pipes, or further pressure valves or regulators. The valve 16 may, for example, comprise a VIPR (Valve with Integrated Pressure Regulator).

The valve body 26 can be axially adjusted towards or away from the valve seat 28 by means of rotation of a graspable handle 30 selectively to open or to close the outlet 24. In other words, movement of the valve body 26 towards or away from the valve seat 28 selectively controls the area of the communication passageway between the interior of the gas cylinder body 14 and the outlet 24. This, in turn, controls the flow of gas from the interior of the gas cylinder 12 to the external environment.

The very high pressures under which gases are stored in gas cylinders present a number of potential safety hazards. The need to safely contain gas under these conditions often requires robust and rigid gas cylinder structures. In addition, the valve itself needs to be structurally rigid to prevent leaks, and the connection to the cylinder body must be sufficiently robust.

However, these measures often result in a gas cylinder assembly which is very heavy. Consequently, there is a need to provide arrangements which enable a gas cylinder to be lifted and manoeuvred easily in use without causing potential injury to operators or users.

It is known to protect a valve with a guard. For larger cylinders, metallic guards are provided and fitted over the top of the cylinder valve and gas cylinder to protect the valve region. However, whilst these arrangements may provide the necessary protection, the need to use metal as the material for the guard imposes limits on the structural form and construction that the guard can take. In addition, the cost of the manufacture of such guards is high and they add further weight to the gas cylinder arrangement.

It is known, in some arrangements, to provide a handle at a top end of a guard or valve arrangement. The handle is located above the valve arrangement in a vertically-orientated, central position. Such arrangements may be suitable for manoeuvring of a smaller gas cylinder. However, for larger gas cylinders, such arrangements have significant drawbacks. Firstly, the location of a handle in vertically-orientated, central position means that the handle can only be manipulated by a single person at a time. Secondly, the location of the handle at an upper end renders the handle at an inconvenient height for lifting, unless the gas cylinder is very small. Many gas cylinder products upwards of 20 liters are of significant weight for a single person to manoeuvre, commonly weighing more than 40 kgs. This may pose health and safety issues.

Gas cylinders are, in general, standard devices which do not comprise handles or lifting arrangements. However, it is known to provide a lifting attachment whereby a pair of handles can be clamped to the gas cylinder body in a scissor arrangement. This device enables a gas cylinder to be manipulated by two users. However, a disadvantage of this arrangement is that a separate device is required which must be stored separately and may not be readily to hand when it is desired to move or lift a gas cylinder. The device must also be fitted to the gas cylinder before manoeuvring which can lead to time delays and inconvenience. In the alternative, keeping such a device semi-permanently attached to a gas cylinder prevents gas cylinders from being stored space-efficiently adjacent one another due to the protruding handles of the device.

Therefore, there exists in the art a technical problem that lifting arrangements for gas cylinders, particularly larger or heavier cylinders, are of limited utility and convenience. As a result, there is a need in the art for an improved lifting arrangement for a gas cylinder.

According to an aspect of the present invention, there is provided a guard structure for a gas cylinder assembly, the gas cylinder assembly comprising a gas cylinder body and a valve, the gas cylinder body including a base and a neck to which a proximal end of the valve is connected in use, the guard structure being securable to the gas cylinder assembly and comprising a guard body arranged, in use, to surround the valve, wherein the guard body further comprises a dependent lip extending around at least a part of the perimeter of the guard body, the dependent lip being located and arranged to be graspable by at least one user to enable the gas cylinder assembly to be lifted and/or manoeuvred.

In one embodiment, the guard structure further comprises a mounting structure attached to an upper end of the valve.

According to a first aspect of the present invention, there is provided a guard structure for a gas cylinder assembly, the gas cylinder assembly comprising a gas cylinder body and a valve, the gas cylinder body including a base and a neck to which a proximal end of the valve is connected in use, the guard structure being securable to the gas cylinder assembly and comprising a mounting structure attached, in use, to an upper end of the valve and a guard body arranged, in use, to surround the valve, wherein the guard body further comprises a dependent lip extending around the perimeter of the guard body, the dependent lip being located and arranged to be graspable by at least one user to enable the gas cylinder assembly to be lifted and/or manoeuvred.

In one embodiment, the dependent lip extends around substantially the entire perimeter of the guard body.

In one embodiment, the dependent lip extends continuously around the perimeter of the guard body.

In one embodiment, the dependent lip is located at a lower end of the guard structure.

In one embodiment, the dependent lip projects away from the guard body.

In one embodiment, the dependent lip extends outwardly and downwardly away from the guard body.

In one embodiment, the dependent lip is downwardly curved.

In one embodiment, the dependent lip is substantially symmetrical about a longitudinal axis of the gas cylinder.

In one embodiment, the dependent lip is arranged, in use, to be located adjacent the neck of the gas cylinder body when the guard structure is located on the gas cylinder assembly.

In one embodiment, the dependent lip is located at a lower end of the guard structure and arranged to surround at least a portion of the neck of the gas cylinder body when the guard structure is located on the gas cylinder assembly.

In one embodiment, the dependent lip is arranged, in use, to extend from a position of conformal contact with the neck of the gas cylinder body and/or a portion of the valve.

In one embodiment, the dependent lip is downwardly-dependent.

In one embodiment, the dependent lip is integrally formed with the guard body.

In one embodiment, the dependent lip is formed from a plastics material.

In one embodiment, the mounting structure is formed from metal and/or has a substantially circular cross section.

In one embodiment, the guard body comprises first and second clamshell portions.

In one embodiment, portions of the first and second clamshell portions are arranged to engage conformally with the mounting structure attached to the valve.

In one embodiment, portions of the first and second clamshell portions are arranged to engage conformally with a mounting structure attached to the valve assembly.

In one embodiment, the guard body further comprises a rotatable cap locatable to secure the first and second clamshell portions to said structure. In one embodiment, the guard body further comprises a rotatable cap locatable to secure the first and second clamshell portions to the mounting structure, the rotatable cap being rotatable about a longitudinal axis of the gas cylinder assembly.

In one embodiment, the rotatable cap is connected by a releasable connection. In one embodiment, the releasable connection is a push fit connection. In one embodiment, the rotatable cap is rotatable about a longitudinal axis of the gas cylinder assembly.

In one embodiment, the guard body is formed from a plastics material.

In one embodiment, the guard body is formed by injection moulding.

In one embodiment, the mounting structure comprises first and second sections. In one embodiment, the second section is formed from thicker material than the first section, the material having a yield stress in the range of 100-250 MPa.

In one embodiment, the valve assembly comprises a regulator.

In one embodiment, the valve assembly comprises a valve with integrated pressure regulator.

In one embodiment, the valve assembly comprises a substantially planar distal end operable to receive the mounting structure of the first aspect.

In one embodiment, the mounting structure is connected to the distal end of the valve assembly by removable or permanent fixings. In one embodiment, the removable fixings comprise bolts.

According to a second aspect of the present invention, there is provided a valve assembly comprising a valve and the guard structure according to the first aspect.

According to a third aspect of the present invention, there is provided a valve assembly comprising a valve and the guard structure of the first aspect, wherein the valve assembly comprises a proximal end connectable to a gas cylinder body and a distal end comprising the mounting structure.

In one embodiment, the valve assembly comprises a regulator.

In one embodiment, the valve assembly comprises a valve with integrated pressure regulator.

In one embodiment, the valve assembly comprises a substantially planar distal end operable to receive the mounting structure of the first aspect.

In one embodiment, the mounting structure is connected to the distal end of the valve assembly by removable or permanent fixings. In one embodiment, the removable fixings comprise bolts.

According to a fourth aspect of the present invention, there is provided a gas cylinder assembly comprising a gas cylinder body and a valve assembly according to the second or third aspects.

In one embodiment, the gas cylinder body has an internal volume in the region of 20 to 50 liters. In one embodiment, the gas cylinder body has an internal volume of approximately 50 liters. In one embodiment, the gas cylinder assembly has a weight in the range of 30 to 120 kgs. In one embodiment, the gas cylinder assembly weighs 100 or more kgs.

Embodiments of the present invention will now be described in detail with reference to the accompanying drawings, in which.

The present invention relates to a handling arrangement for a gas cylinder and valve assembly. A guard structure is attached to the regulator and comprises a dependent lip to enable the gas cylinder to be lifted conveniently and safely by two or more personnel simultaneously.

Figures 1, 2:
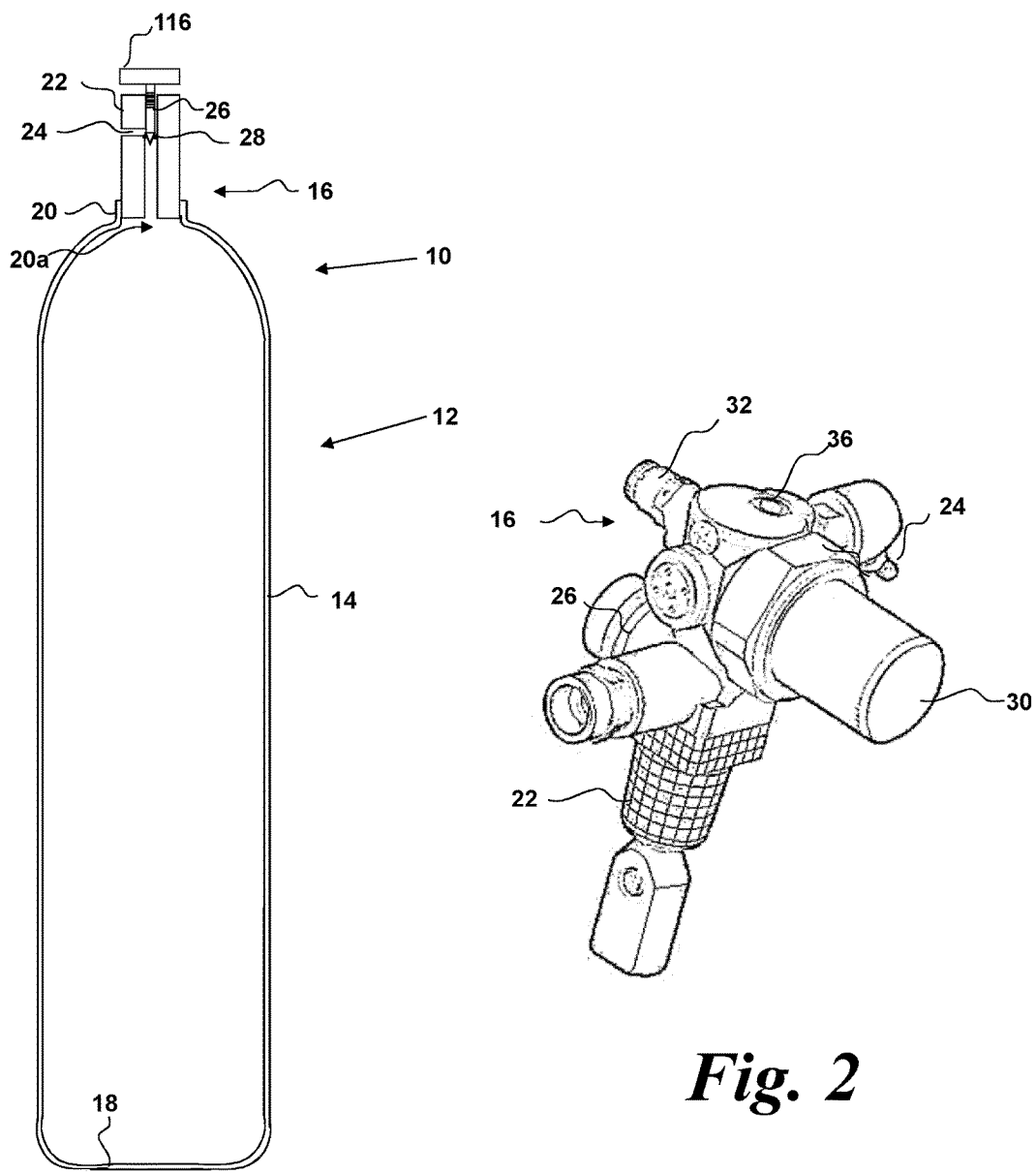
FIG. 1 is a schematic diagram of a gas cylinder and valve assembly.
FIG. 2 is a perspective view of a valve assembly and regulator suitable for use with aspects of the present invention.

FIG. 2 shows a perspective view of a valve 16 for use with the present invention.

In this example, and in addition to the features described with reference to the example of FIG. 1, the valve 16 comprises an integrated pressure regulator 30 and a fill port 32 to enable filling of a gas cylinder. Non-exhaustive examples of suitable regulators may be single or double diaphragm regulators. However, the skilled person would be readily aware of variations that could be used with the present invention.

The regulator 30 is operable to receive gas from the interior of the gas cylinder 12 at full cylinder pressure (e.g. 100 bar), but to deliver gas at a substantially constant fixed low pressure (e.g. 5 bar) to the outlet 24. This is achieved by a feedback mechanism whereby a poppet valve, operable to translate towards and away from a valve seat, is connected to a diaphragm. The pressure of gas downstream of the valve is operable to act on the diaphragm in opposition to the biasing force of a spring. A graspable handle 34 (shown in FIGS. 3 and 8) is provided to enable a user to adjust the biasing force of the spring, thereby moving the position of the diaphragm and, as a result, adjusting the equilibrium spacing between the poppet valve and the valve seat. This enables adjustment of the dimensions of the aperture through which the high pressure gas flow from the outlet 24 can pass, and so allows the output pressure to be set.

In this example, the outlet 24 comprises a quick connect orifice. An upper surface 36 of the valve 16 is arranged to receive the mounting structure 102 of an embodiment of the invention as will be described later. The surface 34 of the valve 16 is arranged at a distal end of the valve 16 remote from the connection to the gas cylinder 14 and, when the valve 16 is attached to an upright gas cylinder, will form the top surface of the gas cylinder assembly 10. The surface 34 is substantially planar to enable elements to be fitted easily and securely.

Figure 3:
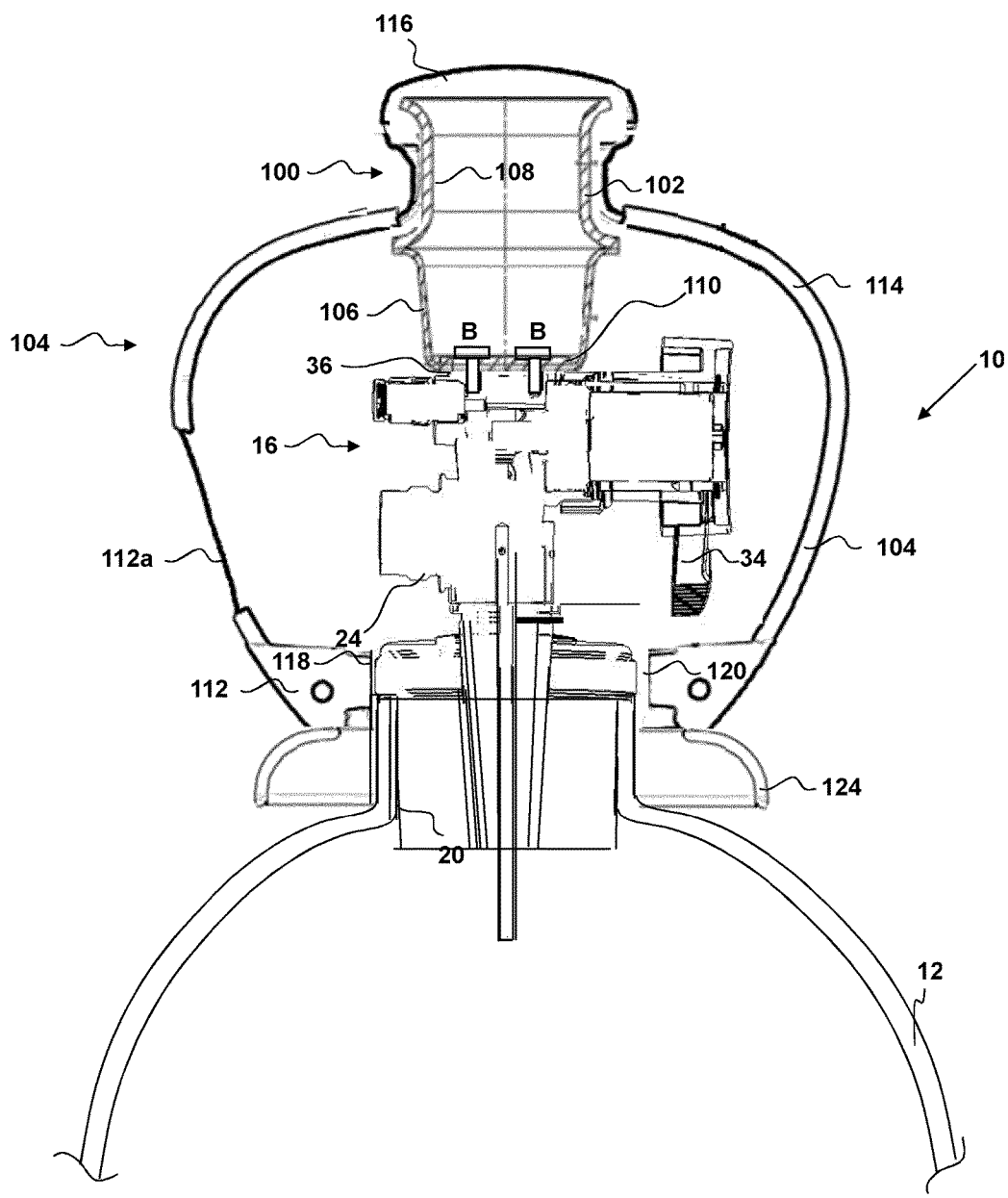
FIG. 3 is a perspective view of a guard structure according to an embodiment connected to the valve of FIG. 2 and a gas cylinder.

FIG. 3 show a guard structure 100 according to an embodiment of the present invention. FIG. 3 shows a section through the guard structure attached to the gas cylinder body 14 and valve 16.

The guard structure comprises two main components: a mounting structure 102 and a guard body 104. The mounting structure 102 provides a mounting point for the guard body 104 as will be described later. In addition, the mounting structure 102 provides a crash structure to protect the valve 16 in the event of an impact scenario. In other words, the mounting structure 102 is arranged to reduce the impact on the cylinder valve 16 should the gas cylinder assembly 10 be dropped inadvertently and land on the valve structure 16. However, whilst the described embodiments illustrate and describe this, the skilled person would readily understand that this is not essential and a structure could be provided which does not serve this function and instead merely provides a mounting point.

Figure 4:
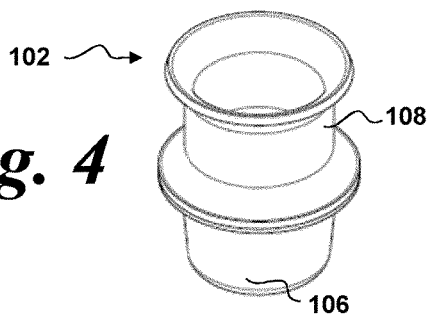
FIG. 4 is a perspective view of a mounting structure of the guard structure of FIG. 3 removed from the valve.

The mounting structure 102 is shown in FIG. 4 removed from the guard structure 100 and valve 16. The mounting structure 102 comprises first and second sections 106, 108. The first section 106 has a tapered cylindrical form and comprises a base 110. The base 110 is arranged to connect to the upper surface 36 of the valve 16.

Referring back to FIG. 3, the mounting structure 102 is attached to the upper surface 36 of the valve 16 such that the mounting structure 102 extends upwardly above the valve 16 and forms an upper end of the gas cylinder assembly 10.

In this embodiment, the first section 106 is connected to the cylinder valve 16 by means of mechanical fastenings such as bolts B. However, other connection means may be utilised. For example, other mechanical fastenings direct to the valve 16 may be used such as screws. Alternatively, a bracket arrangement may be used to enable ease of removability. As a further alternative, the mounting structure 102 may be permanently attached to the valve 100 by welding, brazing or riveting.

Additionally, it may be desirable in certain applications to space the mounting structure 102 from the upper end 34 of the valve 16. This may be achieved through use of a washer or spacer between the valve 16 and the mounting structure The second section 108 comprises a cylindrical centre section tapering outwards at either end into flanges. In one embodiment, the first and second sections 106, 108 of the mounting structure 102 are formed from work hardened mild steel. The first and second sections 106, 108 are formed through stamping, pressing or spinning blank material to form the desired shape.

To ensure consistency of material structure, annealing is carried out subsequent to formation of the first and second sections 106, 108 to manage further the material characteristics and prevent inadvertent local hardening of, for example, the second section 108 which may reduce the protection capabilities of the mounting structure 102.

However, whilst the present embodiment is described with reference to mild steel, the skilled person would readily be aware of other materials suitable for use with the present invention. When annealed, it is found that the mild steel used has a material yield stress in the range of 170-250 MPa. However, other materials in the range of 100-250 MPa may also be used, for example aluminium. The yield stress is required to fall within the specified range. If it is too hard or too soft, it will not provide the required protection.

The first and second sections 106, 108 comprise mild steel of different thicknesses. From experimental data, the first section 106 has a thickness of 1.5 mm and a second section 108 has a thickness of 2.64 mm. These dimensions have been found to be optimal for protection of the valve of a 100 kg gas cylinder when the same material is used for both the first and second sections 106, 108. However, other dimensions could be used with different materials and different material strengths.

In order to function as a crash structure, it is desirable is that the first section 106 is operable to deform under a lower load than the second section 102. This may be due to material, structural or geometric properties—for example, this may be due to the reduced strength or hardness of the material of the first section 106 relative to the second section 108. Whilst, in the present embodiment, this is achieved at least in part by provision of a thicker second section 108 when compared to the first section 106, the desired technical effect may be achieved in a different manner.

For example, the second section 108 may have the same or similar material thickness to the first section 106 but be formed from a harder material or a material with a greater resistance to tensile stress. Further, different geometries and structures may be used for the first and second sections 106, 108 to provide the necessary utility. For example, a honeycomb or other reinforcing structure may be used for the second section 108 to provide enhanced rigidity over and above the first section 106.

Nevertheless, the skilled person would be readily aware that, irrespective of the material and/or structural choice for the first and second sections 106, 108, the strength of the first section 106 is required to be selected such that the first section 106 collapses under a lower load than either the second section or the valve 16.

In use, in response to an impact, the second section 108 is arranged to transfer impact forces through the first section 106. The first section 106 is, concomitantly, arranged to deform in response to the impact forces to absorb the peak impact force resulting from the impact. In other words, the first section 106 is arranged to function as a "crumple zone" between the second section 108 and the valve 16 to spread the impact force over a longer time period and, as a result, reduce the peak impact force on the valve 16.

Alternatively, the mounting structure 102 need not deform or may be formed from two sections. The skilled person would be readily aware of variations which would fall within the scope of the present invention The mounting structure 102 is predominantly used to strengthen locally the guard structure and to enable location and securing of the guard 104 to the valve 16.

Figure 5:
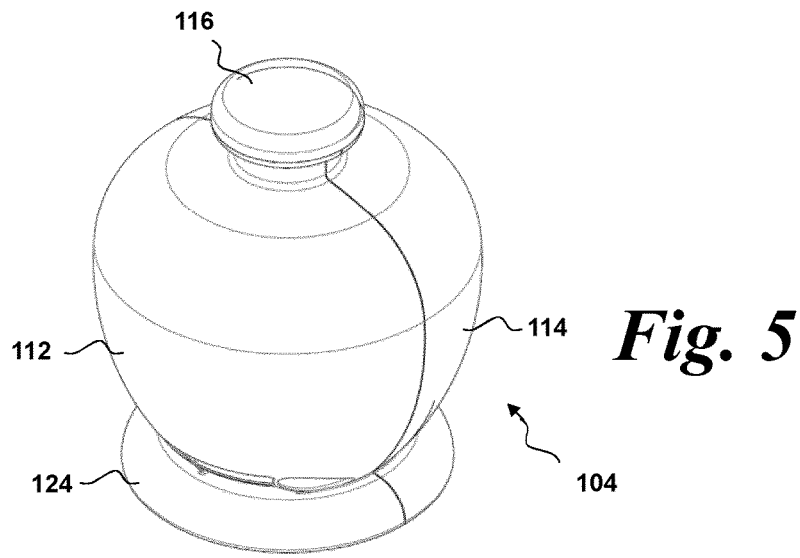
FIG. 5 is a perspective view of a guard body of the guard structure of FIG. 3.
Figure 6:
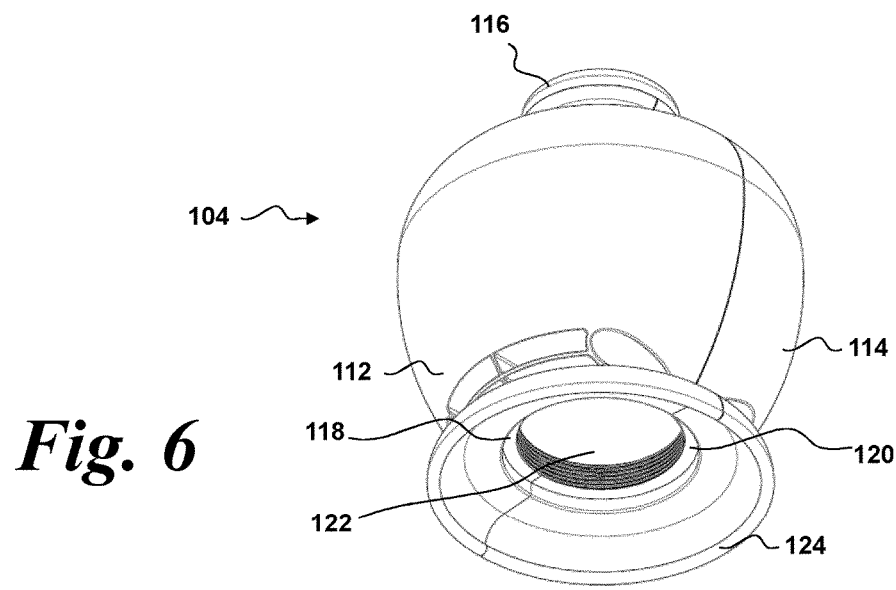
FIG. 6 is an alternative perspective view of the guard structure shown in FIG. 5.

As shown in FIG. 4, the guard body 104 is connected, in use, to the mounting structure 102. FIGS. 5 and 6 show perspective views of the guard body 104 in an assembled form removed from the gas cylinder assembly 10.

As shown in FIGS. 5 and 6, the guard body 104 is formed in three components: first and second housings 112, 114 and a rotatable cap 116. The first and second housings 112, 114 are arranged to form a clamshell structure connected by the rotatable cap 116 at an upper end and by fixing means (such as screws) at a lower end.

Figure 8:
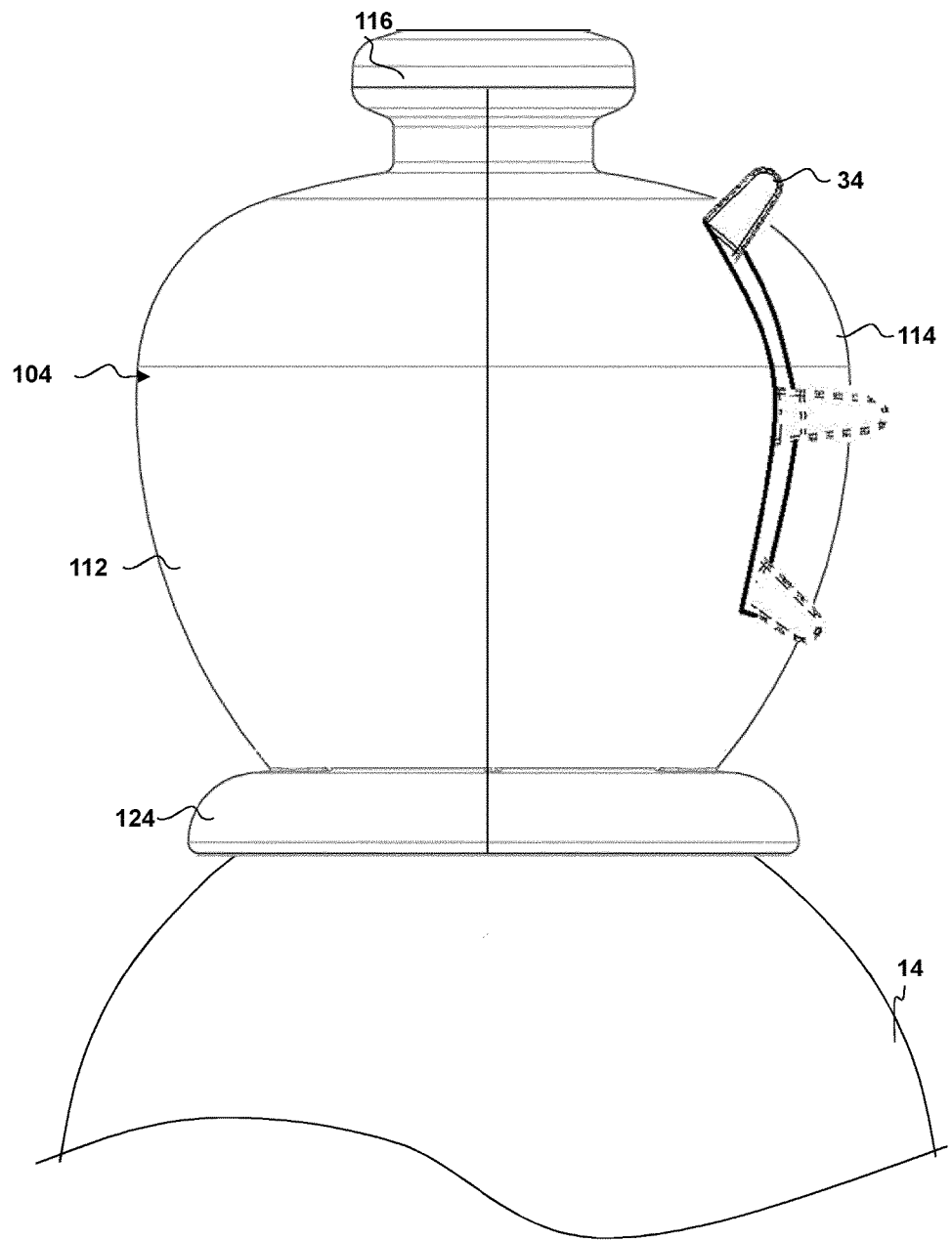
FIG. 8 is an enlarged view of a part of the guard structure and a part of gas cylinder shown in FIG. 7 from a different direction.

When assembled, the first and second housings 112, 114 and the rotatable cap 116 form the guard body 104. The guard body 104 is substantially elliptical and has a circular cross-section. Provision may be made within the structure of the guard body 104 for one or more access ports. These access ports may include items such as a display, or provide access to the outlet 24, the fill port 32 or the graspable handle 34 (as shown in FIG. 8) to enable operation and selection of gas dispensation modes or pressures.

As shown in FIG. 4, the first and second housings 112, 114 are fitted on either side of the valve 16 and mounting structure 102 such that they surround these components. With further reference to FIG. 4, the guard body 104 is arranged to interface with the mounting structure 102 at an upper end and the mounting structure 102 is arranged to support a portion of the guard body 104.

At a lower end, cylindrical portions 118, 120 of the first and second housings 112, 114 respectively define a circular aperture 122 (FIG. 6) through which the valve 16 mounting and neck 20 of the gas cylinder body 14 extend in use. The cylindrical portions 118, 120 engage the neck 20 of the gas cylinder body 14 and/or parts of the valve 16 (e.g. the screwthread mounting portion) in conformal contact to stabilise the guard body 104. Alternatively or additionally, the guard body 104 may be physically secured to the gas cylinder neck 20 or valve 16 in this location.

The guard body 104 is arranged to surround the valve arrangement 16 and mounting structure 102, and provides both structural and environmental protection for the valve 16 and related components. In other words, the guard body 104 forms a housing or cover for the valve 16. Consequently, the guard body 104 and mounting structure 102 together form an enclosure and surround for the valve 16. In this embodiment, the guard body 104 forms a complete enclosure for the valve 16.

Further, the guard body 104 improves the aesthetic appearance of the cylinder assembly 10 and enables further items to be contained within; for example, an electronic display (arranged to fit in an aperture 112a formed in the first housing 112) or additional electronics or components required for operation of the gas cylinder assembly 10.

However, in contrast to known arrangements and surrounds, the permanent or semi-permanent attachment of the mounting structure 102 to the valve 16 itself permits a greater flexibility in design freedom for the guard body 104 whilst still providing the necessary structural rigidity to enable the guard body 104 to be fitted to larger cylinders of the order of 100 kgs. In other words, the mounting structure 102 forms an integrated part of the valve 16 arranged to connect the guard body 104 to the valve 16 and which permits the guard body 104 to be used with a wide range of cylinder sizes and weights.

Figure 7:
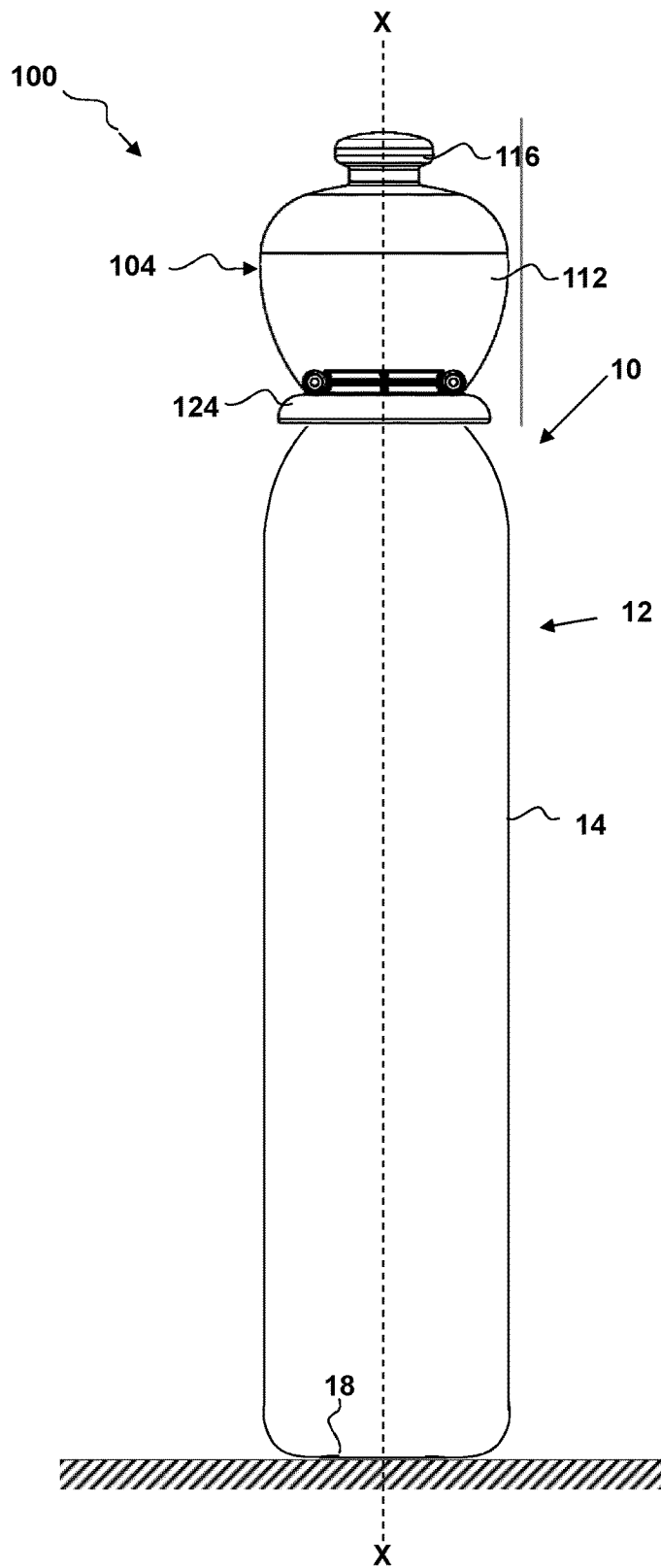
FIG. 7 is an external view of the guard structure attached to a gas cylinder located on a floor surface.

The rotatable cap 116 is connected by means of a push-fit connection to the top of the first and second housings 112, 114 to hold them in place at an upper end. The rotatable cap 116 is arranged to rotate about the longitudinal axis X-X (FIG. 7) of the gas cylinder 12 and around the upper end of the guard body 104 and mounting structure 102 so that the cylinder assembly 10, when in an upright position, can be rolled by a user whilst the user holds the rotatable cap 116 with one hand. The fixing means are then used at a lower end of the guard body 104 to secure the first and second housings 112, 114 to one another and to the valve 16.

The first and second housings 112, 114 may be made from any suitable material. However, the choice of material is considerably wider than for conventional metallic or thick-plastic guards because the strength and structural integrity requirements of the guard body 104 are lower due to the presence of the mounting structure 102. Nevertheless, injection moulded plastics material is the preferred material choice due to the ease of manufacture and the range of design freedom. Plastics materials such as ABS or polycarbonate may be used in non-limiting and non-exhaustive examples.

As shown in FIGS. 3 and 5 to 8, the guard body 104 comprises a dependent lip or skirt 124. The skirt 124 depends from the lower portion of the guard body 104 and extends around the base of the guard body 104. The skirt 124 takes the form of a dependent lip which is arranged to surround the neck of the gas cylinder 12 and has a downwardly-depending curved cross-section when viewed in a vertical plane as shown in FIG. 4. The skirt 124 extends downwardly and outwardly from below the cylindrical portions 118, 120 and so, in this embodiment, extends from a position in conformal contact with the neck 20 of the gas cylinder body 14 and/or valve 16 to a position radially outward of the neck 20.

In this embodiment, the skirt 124 is arranged to be graspable by personnel to facilitate lifting, handling and general manoeuvring of the gas cylinder assembly 10. Conventional gas cylinders are often provided with a handle at an upper end. However, such handles are often only suitable to be grasped by a single user. Given the weight of such cylinders, which may be in excess of 100 kgs, this is often impractical or unsafe. Further, the location of a handle relatively high (e.g. on the top of a cylinder as is known) presents difficulties for a user to attempt to lift the cylinder using such a handle.

In contrast to known arrangements, the skirt 124 is arranged at a lower height (at approximately the neck 20 of the gas cylinder 12 when the valve 16 and guard body 104 are installed on the gas cylinder body 14) enabling personnel to lift and manipulate the cylinder 12 more readily.

Further, in this embodiment, the skirt 124 extends around the entire circumference of the gas cylinder assembly 10. This permits two users to grasp a gas cylinder assembly 10 irrespective of the rotational orientation of the cylinder assembly 10. In other words, the location and arrangement of the skirt 124 permits straightforward lifting of the gas cylinder assembly 10 by two or more users stood either side of the gas cylinder assembly 10.

The arrangement of the skirt 124 creates an annular space surrounding the neck 20 of the gas cylinder body 14 between the gas cylinder body 14 and the valve 16 and main part of the guard 104. This enables a user to hook conveniently and comfortably their fingers under the dependent lip 124 to manoeuvre the gas cylinder assembly 10.

Due to the configuration of the guard structure 100 comprising the mounting portion 102, the guard body 104 and the skirt 124 can be formed from a plastics material. This enables the skirt 124 to be ergonomic in shape and comfortable to grasp.

Finally, the skirt 124 is permanently attached to the gas cylinder 12 and does not require a separate lifting apparatus such as a removable lifting clamp. This aids in the convenience of manoeuvre of the cylinder 12. The skirt 124 also has a narrower radius than the gas cylinder body 14 and so does not form an unwanted protrusion which would prevent gas cylinders from being stored close to one another.

Variations will be apparent to the skilled person would be readily aware of alternatives that would fall within the scope of the present application. For example, whilst the above embodiment has been described with reference to a mounting structure, guard and valve assembly, the mounting structure and guard may be supplied without the valve and retrofitted to existing valves and cylinders.

Whilst the above embodiment has been described with reference to particular valve and gas cylinder arrangements, it is to be understood that the present invention is applicable to a range of suitable gas cylinder assemblies.

The guard structure may differ from that shown and described without departing from the scope of the present invention. For example, the dependent lip need not extend around the entire circumference of the guard, and may have gaps or spacers around the circumference.

In addition, alternative materials and structures may be used as appropriate. For example, the lip or skirt may take a different form and still fall within the scope of the present invention. Whilst the lip or skirt is illustrated as being integrally formed with the first and second housings of the guard body, this need not be the case. The skirt may be separately formed and may be attached by suitable securing means. Alternatively, the skirt may not be circular and may vary in radius around the circumference of the skirt; for example, to provide a plurality of hand grips or graspable portions.

The dependent lip, whilst described as a structure extending away from the guard body, may alternatively be formed as a recessed channel within the guard body, a part of the guard body above the recessed channel forming a graspable lip to lift the gas cylinder.

In addition, the mounting structure may be formed from different materials than those described in relation to the above embodiment. Other suitable materials may be: brass; aluminium; copper; or suitable alloys.

Further, the first and second sections of the mounting structure need not be formed from the same material. Dissimilar materials having different thicknesses or hardnesses may be used to provide the necessary deformability of the first section relative to the second section.

The mounting structure need not have the specific shape described. Cross-sectional shapes other than circular may be used; for example, square, oval or polygonal. In addition, the relative dimensions and proportions may be varied as appropriate to maintain the desired material and functional properties.

Embodiments of the present invention have been described with particular reference to the examples illustrated. While specific examples are shown in the drawings and are herein described in detail, it should be understood, however, that the drawings and detailed description are not intended to limit the invention to the particular form disclosed. It will be appreciated that variations and modifications may be made to the examples described within the scope of the present invention.

The invention claimed is:

1. A guard structure securable to a gas cylinder assembly having a gas cylinder body and a valve, the gas cylinder body including a base and a neck, the valve being bounded by a proximal end connected, in use, to the neck of the gas cylinder body and a distal end remote from the neck of the gas cylinder body, the distal end of the valve having an upper surface opposite and most distal from the gas cylinder body, the guard structure comprising:
   a mounting structure having a base attached, in use, to the upper surface of the distal end of the valve and extending further distal from the valve;
   one or more fasteners securing the base of the mounting structure to the upper surface of the distal end of the valve;
   a guard body supported, in use, by the mounting structure, and surrounding the mounting structure and the valve; and
   a dependent lip extending downwardly from a lower portion of the guard body and positioned radially outward from the neck of the gas cylinder body such that fingers of a user can be hooked under the dependent lip to enable the gas cylinder assembly to be lifted and/or manoeuvred.

2. The guard structure according to claim 1, wherein the dependent lip extends around substantially the entire perimeter of the guard body.

3. The guard structure according to claim 1, wherein the dependent lip arranged to surround at least a portion of the neck of the gas cylinder body when the guard structure is located on the gas cylinder assembly.

4. The guard structure according to claim 3, wherein the dependent lip is arranged, in use, to extend from a position of conformal contact with the neck of the gas cylinder body and/or a portion of the valve.

5. The guard structure according to claim 1, wherein the dependent lip is integrally formed with the guard body.

6. The guard structure according to claim 1, wherein the mounting structure is formed from metal and/or has a substantially circular cross section.

7. The guard structure according to claim 1, wherein the guard body comprises first and second clamshell portions.

8. The guard structure according to claim 7, wherein portions of the first and second clamshell portions are arranged to engage conformally with the mounting structure attached to the valve.

9. The guard structure according to claim 8, wherein the guard body further comprises a rotatable cap locatable to secure the first and second clamshell portions to the mounting structure, the rotatable cap being rotatable about a longitudinal axis of the gas cylinder assembly.

10. The guard structure according to claim 1, wherein the guard body is formed from a plastics material.

11. A valve assembly comprising a valve and the guard structure according to claim 1.

12. A valve assembly according to claim 11, wherein the valve assembly comprises a proximal end connectable to a gas cylinder body and a distal end secured to the mounting structure.

13. A gas cylinder assembly comprising a gas cylinder body and a valve assembly according to claim 11.

14. The guard structure according to claim 1, wherein the dependent lip extends downwardly and outwardly.

* * * * *